March 15, 1960 J. R. GOMERSALL 2,928,552
RACK FOR FOOD TRAY
Filed April 2, 1954 2 Sheets-Sheet 2
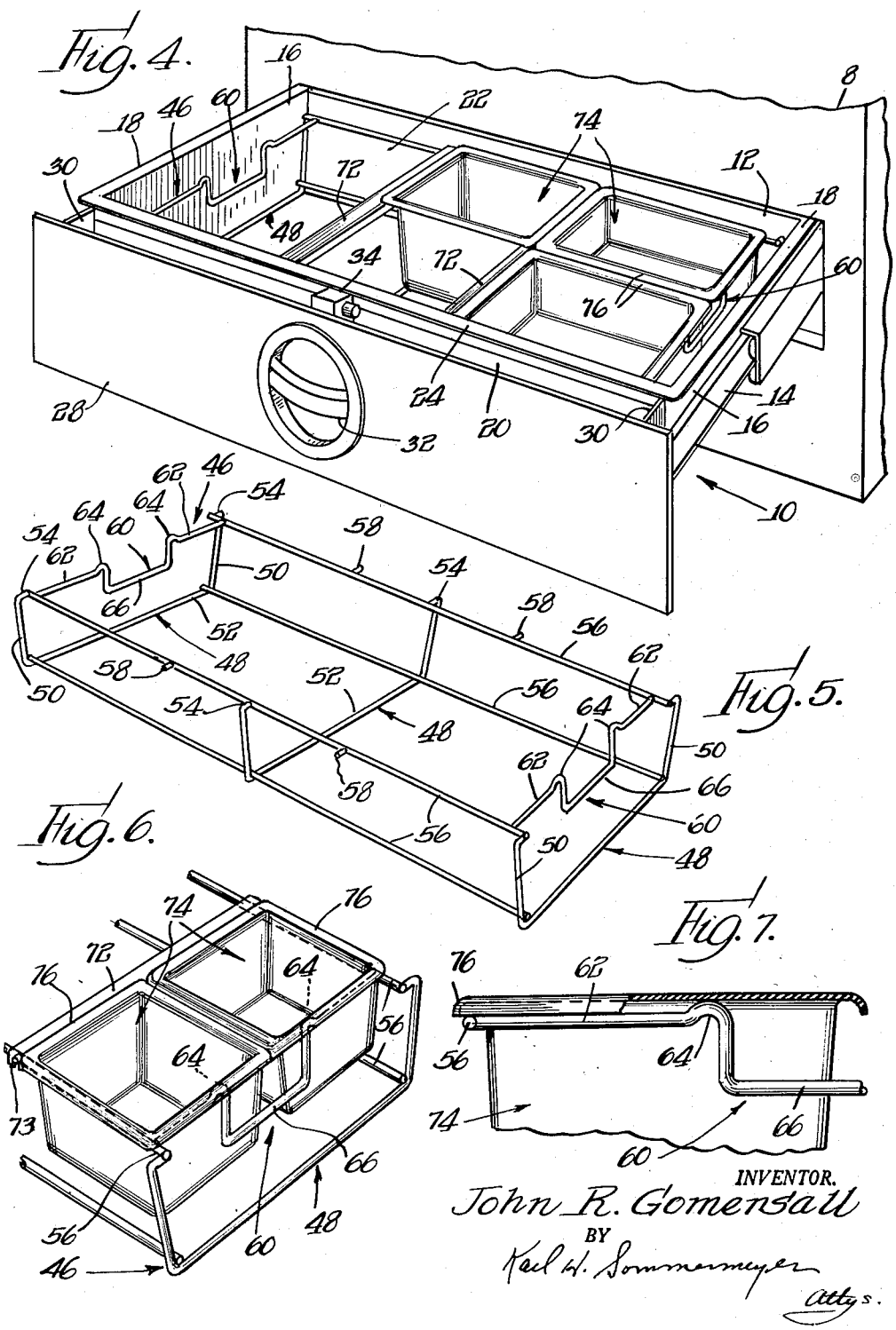
INVENTOR.
John R. Gomersall
BY
Karl H. Sommermeyer
attys.

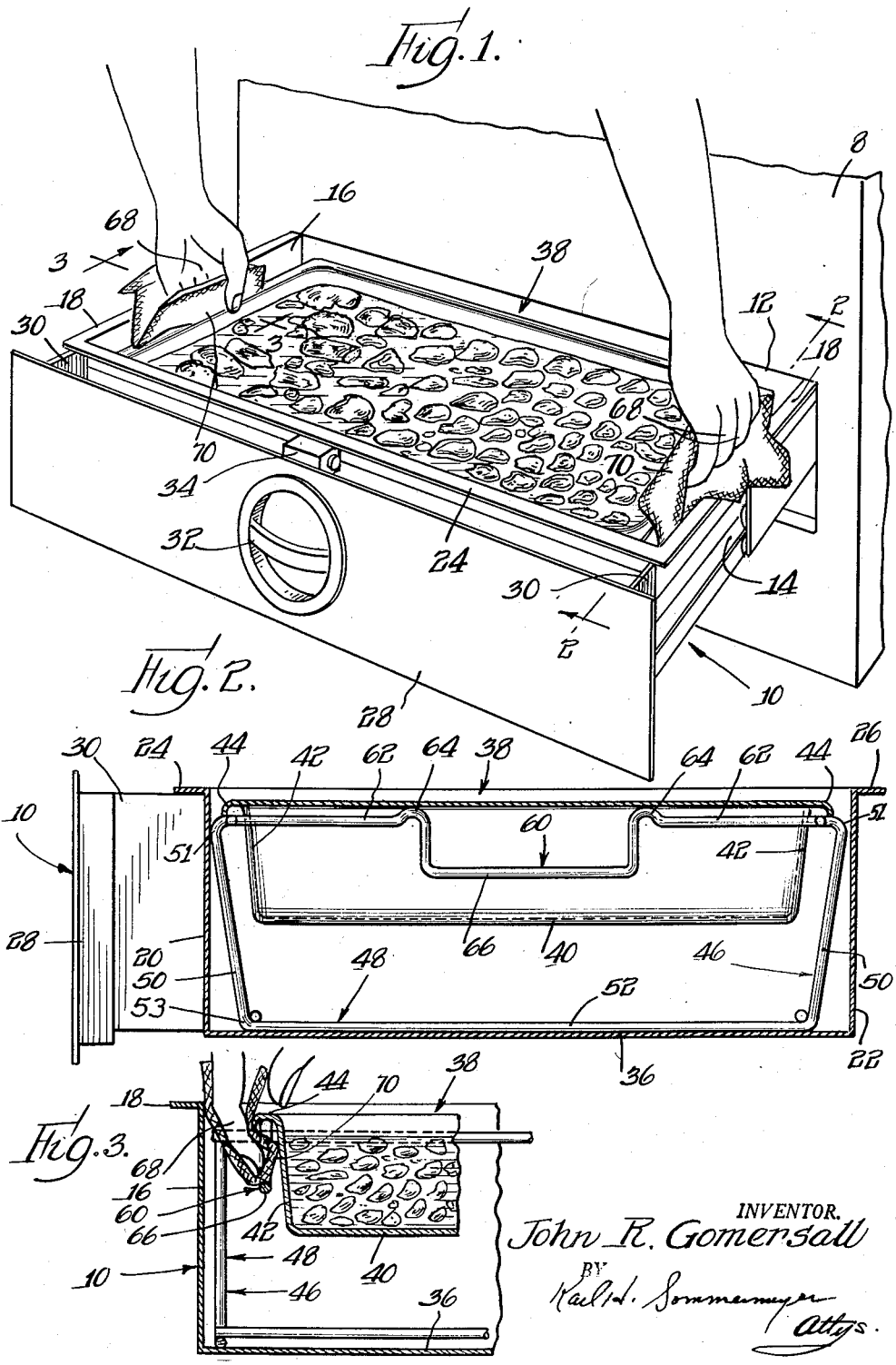

United States Patent Office 2,928,552
Patented Mar. 15, 1960

2,928,552

RACK FOR FOOD TRAY

John R. Gomersall, Elgin, Ill., assignor to McGraw-Edison Company, a corporation of Delaware Application April 2, 1954, Serial No. 420,577

5 Claims. (Cl. 211—71)

This invention is related to hot food servers and more particularly to racks for supporting pans or trays of food therein.

In restaurants, hospitals, dormitories, and various other establishments it is necessary to prepare large quantities of food which may be held until mealtime and then dispensed in individual helpings over an extended period of time. Heated cabinets having a plurality of storage drawers often are used for this purpose, for holding the food and keeping it hot and tasty.

It is desirable that the drawers of the hot food server accommodate various kinds of food including loose articles such as rolls and also trays or pans of meats, stews and vegetables. It is desirable also that the individual drawers be equipped with covers that are adjustable for retaining moisture or for permitting its escape. It is further desirable that the storage space in the drawers constitute as large a proportion as possible of the space occupied by the cabinet. To meet these requirements and desiderata the drawers of my hot food server have high sides with level tops and shallow covers, and, according to the present invention are equipped with removable racks for supporting standard-size steam-table pans. These racks are easily inserted and removed, and they support the pans high in the drawer for easy grasping regardless of the depth of the pan, without interfering with a convenient but secure and balanced grip on the pans, so that the amount by which the dimensions of the drawer exceed those of the pans can be kept small. Standard sizes for steam-table pans include fractional sizes such that two or more small pans will fill the space needed for a full size pan. The rack of my present invention provides firm support for, and permits the easy handling of, these smaller pans too.

Objects of the invention include the provision of an easily insertable and removable rack for supporting food pans or trays in the drawers of a hot food serving cabinet, the provision of a rack that supports the pans for easy insertion and removal, that provides clearance for the hand, that permits a secure grasp of the pan for balanced support and easy handling, the provision of a rack that accommodates pans of various sizes in a drawer of minimum dimensions, and the provision of an improved support for containers of hot food.

These and other objects and advantages of my invention will be apparent from the following description of a specific embodiment thereof when taken in connection with the accompanying drawings wherein:

Fig. 1 is a perspective view illustrating a pan being lifted from a food warmer drawer;

Fig. 2 is a vertical sectional view through the drawer and pan taken substantially along line 2—2 in Fig. 1;

Fig. 3 is another vertical sectional view taken at right angles to that in Fig. 2 and substantially along line 3—3 in Fig. 1;

Fig. 4 is a perspective view of the drawer with several smaller pans therein;

Fig. 5 is a perspective view of the supporting rack;

Fig. 6 is a fragmentary perspective view showing the manner in which the smaller pans are carried by the rack; and Fig. 7 is a fragmentary end view on an enlarged scale with a part of the pan broken away showing the manner in which a small pan is supported by the rack.

Referring first to Fig. 1, there will be seen a fragment of an electrically heated food warming cabinet or hot food server 8. The cabinet 8 is provided with a plurality of drawers, one of which is shown at 10, said drawers being mounted for sliding movement in and out of the cabinet through suitable openings 12 on any suitable or known slide mechanisms 14.

The drawer 10 (Figs. 1–4) is made of stainless steel and is provided with side walls 16 having outward directed flanges 18 thereon, and with front walls 20 and rear walls 22 respectively having outward directed flanges 24 and 26 at the upper edges thereof and coplanar with the side flanges 18. The drawer further is provided with an insulating forward wall 28 spaced forward from the front wall 20 by metal plates 30 which are coplanar with the side walls 16. The forward wall 28 is provided with a handle 32 for opening and closing the drawer, and this handle preferably is arranged to operate a latch 34. The drawer is completed by a bottom 36.

Food pans of stainless steel for holding food in the drawers are constructed in a variety of sizes including sub-multiples, two or more of which are designed to occupy substantially the same space as a larger pan. A single, large shallow pan 38 is shown in Figs. 1–3. This pan has a bottom 40, side and end walls 42, and a curled-over or reversely bent peripheral flange 44 along the upper edges of the walls.

A wire rack 46 seen in Figs. 2–5 supports the pan 38 by its flange 44, holding the flange approximately level with the top of the drawer and out of contact with the front and back and side walls. The wire rack rests on the bottom 36 of the drawer 10 and comprises three parallel, longitudinally spaced, cross members or forms 48 of generally U-shaped configuration. These cross members or forms comprise bottom, horizontal bight portions 52 from which rise diverging side legs or risers 50 having inturned tips or fingers 54 at their upper ends. Parallel longitudinal wires or bars 56 are welded along the junctions of the bights 52 and side pieces 50, and also at the tips of the inturned fingers 54.

Two outwardly projecting lugs 58 are welded on each of the uppermost longitudinal members 56, and are spaced approximately one-third of the length of these members from the ends thereof for spacing auxiliary transverse supports for use with the smaller pans as will be brought out shortly.

The rack 46 is completed by a pair of transverse end supports 60. These transverse end supports are welded between the uppermost longitudinal members 56 and are spaced short, equal distances in from the ends thereof for supporting a tray or trays, and also for stiffening the rack. Each of the transverse end members 60 comprises straight sections 62 extending in from the top longitudinal members 56. The straight sections 62 join small, integral, upstanding or raised, inverted U-shaped sections 64, which are integral with a common upright U-shaped member 66 of greater width, which common member constitutes an intermediate, depressed or relieved portion in the transverse piece 60.

As will be apparent in Figs. 2 and 3, the single large pan 38 fits within and is supported by the rack 46. The reversely bent flanges 44 along the longitudinal edges of the pan rest on the fingers 54 of the intermediate cross member 48, and may also rest on the lugs 58 if these lugs are long enough. The edges of the flanges 44 also rest on the upper longitudinal members 56 at the corners of the pan. The inverted U-shaped section 64 of the transverse end members 60 project up sufficiently far to fit within the reversely bent flanges 44 at the ends of the pan for supporting it.

As may be seen in Figs. 2 and 3, the rack just fits into the drawer. Thus in Fig. 2 the upper corners 51 of the cross members or forms 48 serve as spacers or bumpers to locate the rack fore and aft in the drawer. The tilted position of the risers 50 tapers the rack so that the bottom is short, in the fore and aft direction, so that the rack can be tilted for lifting it out and inserting it. Thus the diagonal dimension from the top-rear corner 51 to the bottom front corner 53 is no greater than the dimension between the two top corners 51. Accordingly the front can be lifted out while the bottom rear corner remains in contact with the drawer bottom.

The upper longitudinal members 56, being spaced in from the outermost portion of the cross members 48, position the pan away from the front and back walls of the drawer a short distance. The end pieces 60 are positioned in from the ends of the longitudinal members 56 and from the end cross members 48 a substantial distance, and therefore space the ends of the pan a substantial distance from the side walls of the drawer, thereby providing clearance between the edges of the pan and drawer as shown in Figs. 1 and 3 for a cook's or helper's fingers 68 wrapped in towels 70. Although the towels are needed for protecting the hands from the heat of the pan, they do add to the difficulty of getting a firm grip on the hot pan. The wide U-shaped sections 66 in the end bar 60 of the wire rack provide adequate clearance for the fingers and towel so that a person can get a strong grip beneath the flanges 44 of the pan for lifting the pan from the drawer without spilling the contents or burning the hands.

The rack 46 alternatively may support a plurality of small pans. To this end, channel-shaped dividers or auxiliary supports 72 are laid across the upper longitudinal members 56, fastened there by their downturned, bifurcated tips 73 (Fig. 6) and positioned by the lugs 58. The details of these supports and their cooperation with the rack 46 are set forth particularly in my co-pending application Serial No. 426,852 filed April 30, 1954, now U.S. Patent No. 2,842,269, dated July 8, 1958, and entitled "Rack for Food Pan."

Small pans supported on the rack in this manner are illustrated in Figs. 4, 6, and 7 and are identified generally by the numeral 74. These pans are each substantially half as wide and one-third as long as the pan 38 of Figs. 1 and 2 (measured to the outer edge of the flange) so that six take up the same space on the rack as the single large pan. The pans 74 as shown here are substantially deeper than the pan 38, and therefore extend farther down into the drawer 10 since they are held with their upper edges at the level of the upper edges of the drawer just as pan 38 is held in Figs. 1 and 2. The peripheral flanges 76 of pans 74 rest on the auxiliary supports 72, and the end pans, seen in Fig. 6, rest also on the bar 56 and on the inverted U-shaped sections 64 of the bar 60. As may be seen in Figs. 6 and 7, the U-shaped portion 66 provides no support for the pan corners just above it, but inverted U-bends 64 support the pans sufficiently near the corners thereof to give them adequate support without tipping. These small pans are, of course, easier to handle than a large pan but here too the clearance provided by the U-shaped portion 66 facilitates the work. For example, in Fig. 6, the fingers, protected by a towel, can be inserted in the U-portions 66 for grasping the flange of one of the pans 74, and the other opposite flange can be lifted with the end of a spoon or other handy implement.

It will be apparent that although the sides of the drawer are preferably made full height for holding loose articles such as rolls, and therefore get in the way of the hands when placing pans of food therein, and the drawer should be only big enough to hold standard size food pans, and although the needs for protecting the hands with towels and holding the pan level add to the difficulties, the rack herein shown and described facilitates the handling of such pans of hot food and reduces the clearances required between the edges of the pan and cabinet drawer. The rack supports the pan in the top of the drawer so that the pan flanges are as high as possible for easy grasping with minimum clearance between pan and drawer. This high location of the pan and the finger-clearances provided by the U-shaped portions 66 let both fingers and towel be inserted for a firm grip on the flange. The spacing of the transverse end pieces or supports 60 in from the ends of the rack helps to center the pan in the drawer and insure the proper clearance at each end. The humps or inverted U-shaped sections 64 adjacent the finger clearance spaces provide positive support for the pan or pans in the vicinity of the clearance spaces, and are especially useful for supporting the smaller pans.

It is to be understood that the specific example herein shown and described is for purposes of illustration only. Various structural modifications will doubtless occur to those skilled in the art and are to be considered as forming a part of my invention insofar as they fall within the spirit and scope of the appended claims.

I claim:

1. A rack for supporting food pans in food warmer drawers and the like comprising a plurality of longitudinal members, a plurality of transverse means secured to said longitudinal members and supporting a pair of said longitudinal members in spaced apart, parallel relation spaced above the lowest parts of said transverse means and adapted to be adjacent opposite sides of a food pan, and a pair of end members affixed to said pair of longitudinal members and spaced inwardly from the ends thereof for supporting the ends of a pan with said ends spaced from adjacent sides of a food warmer drawer, said inwardly spaced end members positively insuring spacing of pans from said drawer sides whereby hands and towels or the like can be passed between the drawer sides and the end members for lifting the ends of a pan without burning the hands, said end members comprising elongated members arranged transversely of said longitudinal members and having an intermediate depressed portion providing clearance space for lifting a pan therefrom.

2. A rack as set forth in claim 1 wherein the end members further comprise integral raised portions on opposite sides of and immediately adjacent each depressed portion for supporting end portions of one or more pans.

3. A rack for supporting food pans in food warmer drawers or the like comprising a plurality of elongated longitudinal members, a plurality of transverse means secured to said longitudinal members and supporting a pair of said longitudinal members in spaced apart, parallel relation spaced above the lowest parts of said transverse means and adapted to lie adjacent opposite sides of a food pan, said transverse means securing a pair of longitudinal members adjacent the lowest parts of said transverse means and parallel to one another, said latter pair of longitudinal members being more closely spaced than the first-mentioned pair of longitudinal members and defining substantially the outside lateral edges of said rack, and a pair of end members affixed adjacent the ends of said first-mentioned pair of longitudinal members and adapted to be adjacent the ends of a pan, said end members having an intermediate relieved portion wide enough to pass hands and towels or the like and providing clearance space for lifting a pan therefrom, said end members each having raised portions on opposite sides of and immediately adjacent the relieved portion for supporting one or more pans extending over said clearance space.

4. A rack for supporting food pans in food warmer drawers and the like comprising a plurality of transverse rods of substantially U-shape each having a pair of side legs and a connecting bight and having inturned, substantially confronting ends, said transverse U-shaped rods having relatively long bights and relatively short legs and thereby being relatively wide and shallow, a plurality of longitudinal rods affixed to said transverse rods for maintaining the transverse rods parallel to one another and the longitudinal rods parallel to one another, a pair of the longitudinal rods being affixed to the confronting extremities of said inturned, substantially confronting ends, and another pair of said longitudinal rods being affixed to said transverse rods substantially at the junction of the bight and each U-shaped transverse rod and the legs thereof, and a pair of end rods affixed to the longitudinal rods that are affixed to the inturned, substantially confronting ends of the transverse rods and spaced inwardly from the ends of such pair of longitudinal rods, said end rods having substantially U-shaped intermediate portions which are relatively wide and shallow for providing clearance space for a hand for lifting a pan from the rack, and said end rods further including inverted U-shaped portions on opposite sides of and immediately adjacent each intermediate portion for supporting a pan adjacent the clearance space.

5. A rack as set forth in claim 4 wherein the legs of the transverse rods are more widely spaced at the top than at the bottom.

References Cited in the file of this patent

UNITED STATES PATENTS

| | | |
|---|---|---|
| D. 161,751 | Haring | Jan. 30, 1951 |
| 423,181 | Rix | Mar. 11, 1890 |
| 1,583,295 | Larsen | May 4, 1926 |
| 1,521,289 | Guttman | Dec. 30, 1924 |
| 1,617,064 | Leonard | Feb. 8, 1927 |
| 2,016,246 | Schilling | Oct. 1, 1935 |
| 2,123,837 | Thomas et al. | July 12, 1938 |
| 2,239,482 | Cocks | Apr. 22, 1941 |
| 2,539,326 | Quitter | Jan. 23, 1951 |

FOREIGN PATENTS

| | | |
|---|---|---|
| 931,758 | France | Mar. 3, 1948 |

UNITED STATES PATENT OFFICE
CERTIFICATE OF CORRECTION

Patent No. 2,928,552                                    March 15, 1960

John R. Gomersall

It is hereby certified that error appears in the printed specification of the above numbered patent requiring correction and that the said Letters Patent should read as corrected below.

Column 5, line 14, for "and" read -- of --.

Signed and sealed this 13th day of September 1960.

(SEAL)
Attest:

KARL H. AXLINE
Attesting Officer

ROBERT C. WATSON
Commissioner of Patents